(12) United States Patent
Ahn

(10) Patent No.: US 6,826,238 B2
(45) Date of Patent: Nov. 30, 2004

(54) QUADRATURE AMPLITUDE MODULATION RECEIVER AND CARRIER RECOVERY METHOD

(75) Inventor: Keun Hee Ahn, Inchon-Kwangvokshi (KR)

(73) Assignee: LG Electronics Inc., Seoul (KR)

( * ) Notice: Subject to any disclaimer, the term of this patent is extended or adjusted under 35 U.S.C. 154(b) by 735 days.

(21) Appl. No.: 09/741,049

(22) Filed: Dec. 21, 2000

(65) Prior Publication Data

US 2001/0017897 A1 Aug. 30, 2001

(30) Foreign Application Priority Data

Dec. 21, 1999 (KR) ........................................ 1999-59922

(51) Int. Cl.[7] .............................................. H04L 27/14
(52) U.S. Cl. ........................ 375/326; 375/261; 329/304
(58) Field of Search ................................ 375/326, 222, 375/261, 329, 232, 355, 332, 233, 344, 375, 376, 321; 329/304; 348/731

(56) References Cited

U.S. PATENT DOCUMENTS 5,471,508 A * 11/1995 Koslov ........................ 375/344
5,519,356 A * 5/1996 Greenberg ................... 329/304
6,430,243 B1 * 8/2002 White ......................... 375/376
6,493,409 B1 * 12/2002 Lin et al. ..................... 375/375

OTHER PUBLICATIONS

Jablon, N.K., "Joint blind equalization, carrier recovery and timing recovery for high-order QAM signal constellations", Signal Processing, IEEE Transactions on vol.: 40, Issue: 6, Jun. 1992, pp.: 1383–1398.*

* cited by examiner

Primary Examiner—Shuwang Liu
Assistant Examiner—Ted Wang
(74) Attorney, Agent, or Firm—Birch, Stewart, Kolasch & Birch, LLP

(57) ABSTRACT

Disclosed is a quadrature amplitude modulation (QAM) receiver and a carrier recovery method which receive a signal modulated by the QAM method and recover the frequency offset and phase jitter of the carrier particularly using a weighted phase error inversely proportionate to the magnitude of the deciding signal character, as a result of which the phase jitter of the demodulated signal characters is constant in size irrespective of the magnitude of the deciding signal character. Consequently, acquisition/tracking can be rapidly achieved to minimize the frequency offset of several hundreds of KHz and the phase jitter generated from a tuner or an RF oscillator.

18 Claims, 8 Drawing Sheets

FIG.2
Prior Art
(a) When the demodulated signal character is greater in phase than the deciding signal character
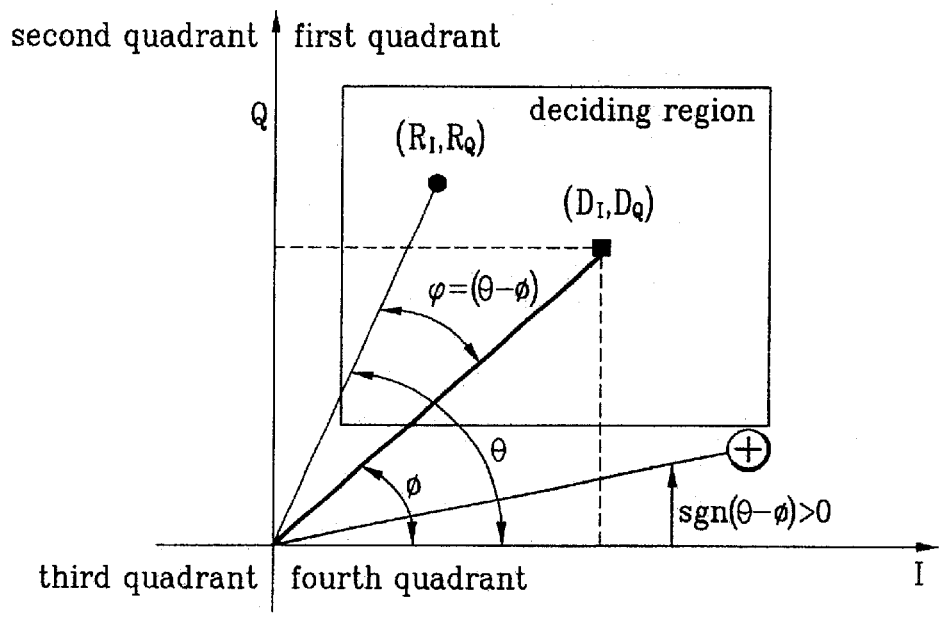
(b) When the demodulated signal character is less in phase than the deciding signal character
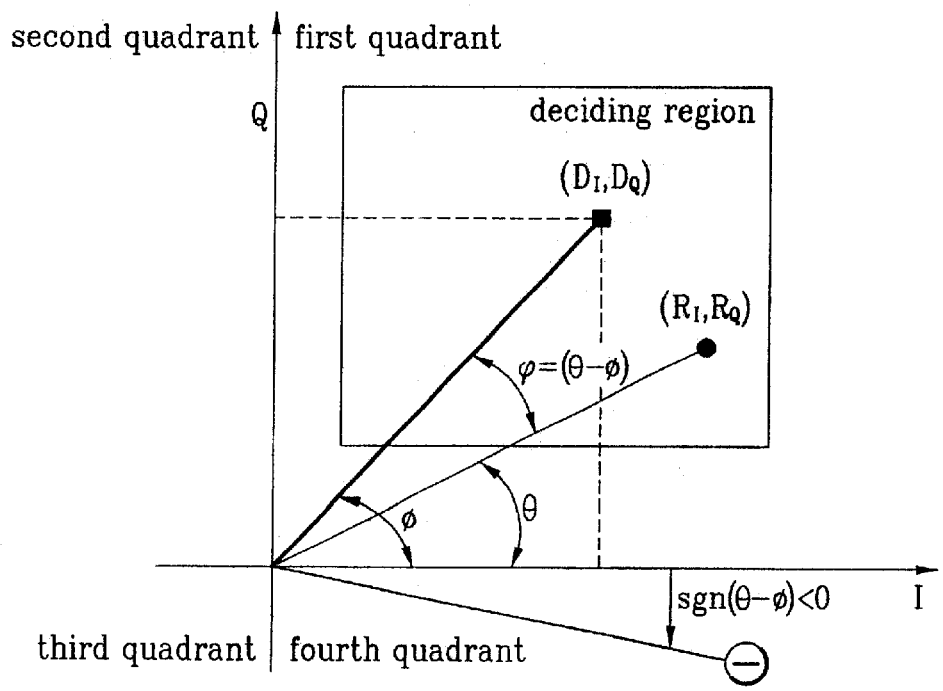

[d] : magnitude of deciding signal character
$d = (D_I^2 + D_Q^2)$

[W] : decoded weight information
$W(I)$

QUADRATURE AMPLITUDE MODULATION RECEIVER AND CARRIER RECOVERY METHOD

BACKGROUND OF THE INVENTION

1. Field of the Invention

The present invention relates to a receiver for receiving signals modulated by quadrature amplitude modulation (QAM) and, more particularly, to a QAM receiver and a carrier recovery method for receiving QAM signals and recovering the frequency offset and the phase jitter of carrier waves.

2. Description of the Related Art

The transmission methods of digital TV's are largely classified into two methods: the one is the vestigial side band (VSB) method using a single carrier and the other is the coded orthogonal frequency division (OFDM) method using multiple carriers.

The OFDM method using multiple carriers readily recovers the signals damaged by multi-path channels and, unlike the VSB method using a single carrier, supports a single frequency network.

OFDM data are mapped by the QAM method prior to being transmitted, which transmission method is widely used for cable TV's in U.S.A.

A QAM receiver receives radio frequency (RF) signals, mapped by the QAM method, via a tuner to perform a data recovery. Meanwhile, the tuner or the RF generator incurs frequency offset of several hundreds of KHz and phase jitter, which have to be minimized in order to achieve an accurate data recovery. The acquisition/tracking procedure for minimizing frequency offset and phase jitter is called "carrier recovery".

FIG. 1 is a schematic block diagram showing the structure of a carrier recovery device in the conventional QAM receiver, in which the carrier recovery device includes a polar decision-oriented phase error detector 101, a loop filter 101d, and a numerical control oscillator (NCO) 101e. The polar decision-oriented phase error detector 101 includes a mixer 101a, a decider 101b, and a polar decision-oriented phase error generator 10c.

Referring to FIG. 1, the mixer 101a of the polar decision-oriented phase error detector 101 demodulates a passband digital signal having frequency offset and phase jitter, generated by a preprocessing unit 100, with sine/cosine waves generated by the numerical control oscillator 101e to produce a baseband digital signal $(R_I, R_Q)$ with the frequency offset and phase jitter recovered.

The decider 101b generates a deciding signal character $(D_I, D_Q)$ conformable to the individual signal level of the baseband digital signal $(R_I, R_Q)$ demodulated by the mixer 101a.

For example, when the baseband digital signal $(R_I, R_Q)$ falls in the deciding region of the first quadrant in the QAM character diagram of FIG. 2, the decider 101b generates a deciding signal character $(D_I, D_Q)$ judging that the baseband digital signal $(R_I, R_Q)$ is present in the first quadrant.

The polar decision-oriented phase error generator 101c detects a phase error by using the baseband digital signal $(R_I, R_Q)$ demodulated by the mixer 101a and the deciding signal character $(D_I, D_Q)$ generated from the decider 101b.

Namely, the polar decision-oriented phase error generator 101c calculates the difference between the phase θ of the demodulated baseband digital signal $(R_I, R_Q)$ and the phase φ of the deciding signal character $(D_I, D_Q)$, and detects the polarity of the phase difference. The characteristic function e(φ) of the polar decision-oriented phase error generator 101c can be expressed by the following equation 1. Diagrams (a) and (b) of FIG. 2 represent the geometrical characteristics of e(φ).

Diagram (a) of FIG. 2 shows that the result of e(φ) has a positive value, i.e., sgn(θ−φ)>0 because the phase θ of the demodulated signal character is greater than the phase φ of the deciding signal character. Contrarily, diagram (b) of FIG. 2 shows that the result of e(φ) has a negative value, i.e., sgn(θ−φ)<0 because the phase θ of the demodulated signal character is less than the phase φ of the deciding signal character.

$$e(\phi)=sgn(\theta-\phi)=sgn(R_Q*D_I-R_I*D_Q) \qquad \text{[Equation 1]}$$

In the equation 1, the sng(#) operator represents an operator for detecting the polarity of #; $R_I$ and $R_Q$ the in-phase and quadrature components of the demodulated signal character, respectively; θ the phase of the demodulated signal character; $D_I$ and $D_Q$ the in-phase and quadrature components of the deciding signal character, respectively; φ the phase of the deciding signal character.

FIG. 3 is a detailed block diagram showing the hardware configuration of the above mechanism, i.e., polar decision-oriented phase error generator 101c.

In the polar decision-oriented phase error generator 101c, multipliers 301 and 302 and subtracter 303 determine the phase error between the deciding signal character $(D_I, D_Q)$ generated by the decider 101b and the demodulated signal character $(R_I, R_Q)$ generated by the mixer 101a, according to the equation 1. Polarity detector 304 detects the polarity from the phase error determined by the substracter 303. Accordingly, the polar phase error e(φ) thus detected has a value of +1, 0 or −1. The output of the polar decision-oriented phase error generator 101c is fed into the loop filter 101d.

The loop filter 101d, which uses a general primary baseband loop filter, cumulates the phase error e(φ) detected by the polar decision-oriented phase error generator 101c to generate an intermediate frequency $\omega_c$ as the sum of the frequency offset Δω and the phase jitter Δθ.

The numerical control oscillator 101e generates sine and cosine waves of which the center frequency is the intermediate frequency $\omega_c$ generated by the loop filter 101d. The sine and cosine waves are output to the mixer 101a.

However, the conventional carrier recovery device applies the polar phase error e(φ) to all characters regardless of the magnitude of the deciding signal character, i.e., $D_I^2+D_Q^2$, so that the phase jitter of the demodulated signal character increases with an increase in the magnitude of the deciding signal character $D_I^2+D_Q^2$, as shown in FIG. 9. That is, the demodulated signal character has a phase jitter that increases with an increased distance from the origin. This results in a deterioration of the signal-to-noise ratio (SNR) performance of the receiver, i.e., a deterioration of the acquisition/tracking performance even at a relatively small input SNR.

Such a narrow acquisition/tracking range not only causes a need of using a high-quality tuner of excellent mechanism, thus raising the expense of the tuner, but also leads to a deterioration of the BER performance of the receiver due to the great residual phase jitter.

SUMMARY OF THE INVENTION

It is, therefore, an object of the present invention to solve the problems with the prior art and to provide a QAM receiver and a carrier recovery method in which a weighted value variable depending on the magnitude of the deciding signal character is applied to the polar phase error so as to stably detect the accurate phase error.

To achieve the above object of the present invention, there is provided a QAM receiver including: a signal generator for multiplying the passband digital signal by a sine/cosine wave into a demodulated baseband digital signal, and generating a deciding signal character conformable to the individual signal level of the demodulated baseband digital signal; a first phase error measurer for calculating the phase difference between the demodulated baseband digital signal and the deciding signal character, and detecting the polarity of the phase difference to be output as a first phase error; a second phase error measurer for using the first phase error detected by the first phase error measurer to output a second phase error having a weighted value; and a filter and an oscillator for cumulating the received second phase error, and generating a sine/cosine wave proportionate to the cumulated phase error, the sine/cosine wave being output to the signal generator.

The second phase error measurer includes: a weight information generating decoder for calculating the magnitude of the received deciding signal character, and generating weight information proportionate to the magnitude of the deciding signal character; a first memory for storing positively weighted phase errors inversely proportionate to the weight information; a second memory for storing negatively weighted phase errors inversely proportionate to the weight information; a first selector using the weight information as a selection signal to selectively output one of the positively weighted phase errors stored in the first memory; a second selector using the weight information as a selection signal to selectively output one of the negatively weighted phase errors stored in the second memory; and a third selector using the first phase error as a selection signal to selectively generate the output of the first or second selector, or "0" as a second phase error.

The magnitude of the deciding signal character is the vector size from the origin to the deciding signal character $(D_I, D_Q)$.

The weight information generating decoder decodes the deciding signal characters of the same radius into the same weight information.

The first and second memories store normalized positively and negatively weighted phase errors, respectively.

According to another aspect of the present invention, there is provided a carrier recovery method for the QAM receiver including the steps of: (a) multiplying the passband digital signal by a sine/cosine wave into a demodulated baseband digital signal, and generating a deciding signal character conformable to the individual signal level of the demodulated baseband digital signal; (b) calculating the phase difference between the demodulated baseband digital signal and the deciding signal character, and detecting the polarity of the phase difference to be output as a first phase error; (c) using the first phase error as a control signal to output a second phase error having a weighted value; and (d) cumulating the received second phase error, and generating a sine/cosine wave proportionate to the cumulated phase error, the sine/cosine wave being output to the step (a).

The step (c) includes the steps of: determining the magnitude of the received deciding signal character, and generating weight information proportionate to the magnitude of the deciding signal character; storing positively weighted phase errors inversely proportionate to the weight information; storing negatively weighted phase errors inversely proportionate to the weight information; using the weight information as a selection signal to selectively output one of the positively weighted phase errors stored in the first storing step; using the weight information as a selection signal to selectively output one of the negatively weighted phase errors stored in the second storing step; and using the first phase error as a selection signal to selectively generate the output of the first or second selecting steps, or "0" as a second phase error.

The present invention applies a weight value variable depending on the magnitude of the deciding signal character to the polar phase error so that the phase jitter has a constant shape regardless of the magnitude of the deciding signal character.

BRIEF DESCRIPTION OF THE DRAWINGS

FIG. 2 is a diagram showing the geometrical characteristics of the polar decision-oriented phase error generator shown in FIG. 1, in which (a) shows an example that the phase of demodulated signal character is greater than that of deciding signal character, and (b) shows another example that the phase of demodulated signal character is less than that of deciding signal character;

DETAILED DESCRIPTION OF THE PREFERRED EMBODIMENT

Hereinafter, the present invention will be described in detail by way of the preferred embodiments, which are not intended to limit the scope of the present invention.

Figure 4:
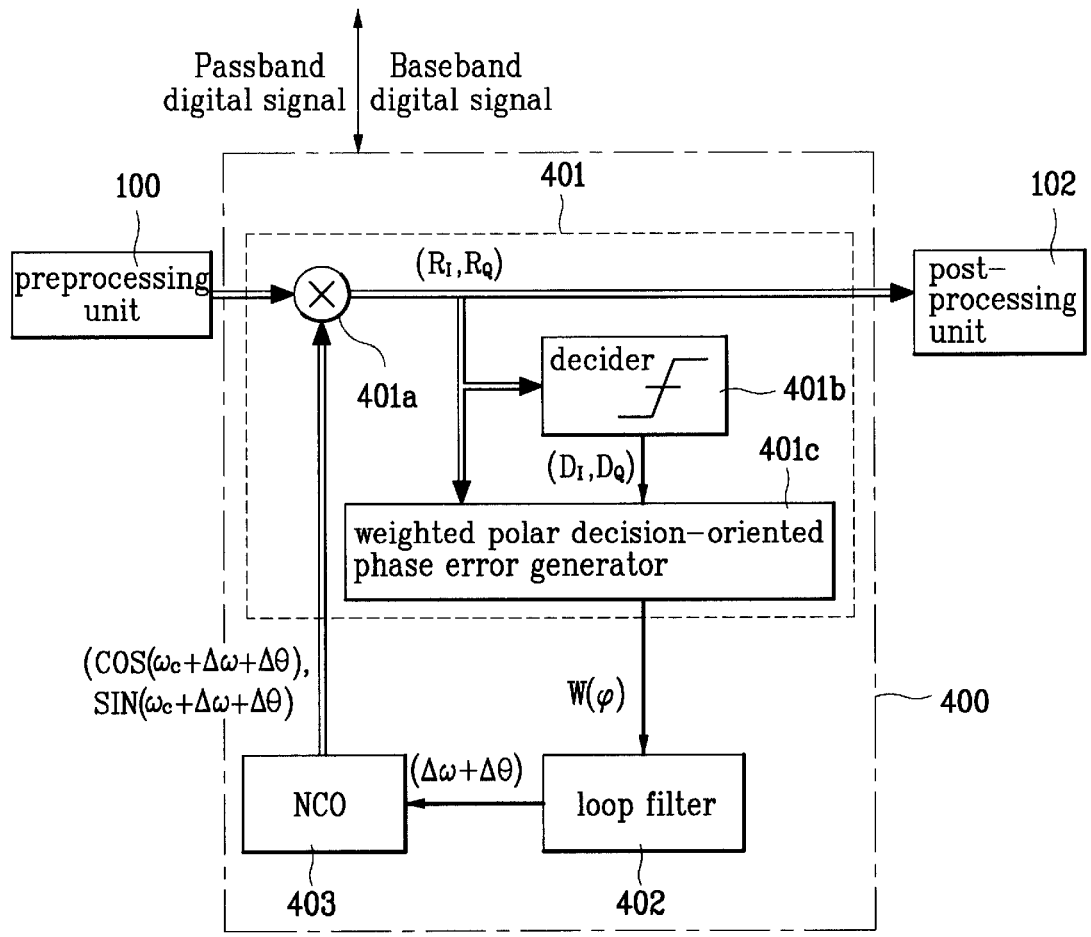
FIG. 4 is a schematic block diagram of a carrier recovery device in a QAM receiver according to the present invention.

FIG. 4 is a schematic block diagram showing the structure of a carrier recovery device 400 in a QAM receiver according to the present invention, in which the carrier recovery device includes a weighted polar decision-oriented phase error detector 401, a loop filter 402, and numerical control oscillators (NCO) 403. The weighted polar decision-oriented phase error detector 401 includes a mixer 401a, a decider 401b, and a weighted polar decision-oriented phase error generator 401 c.

Figure 1:
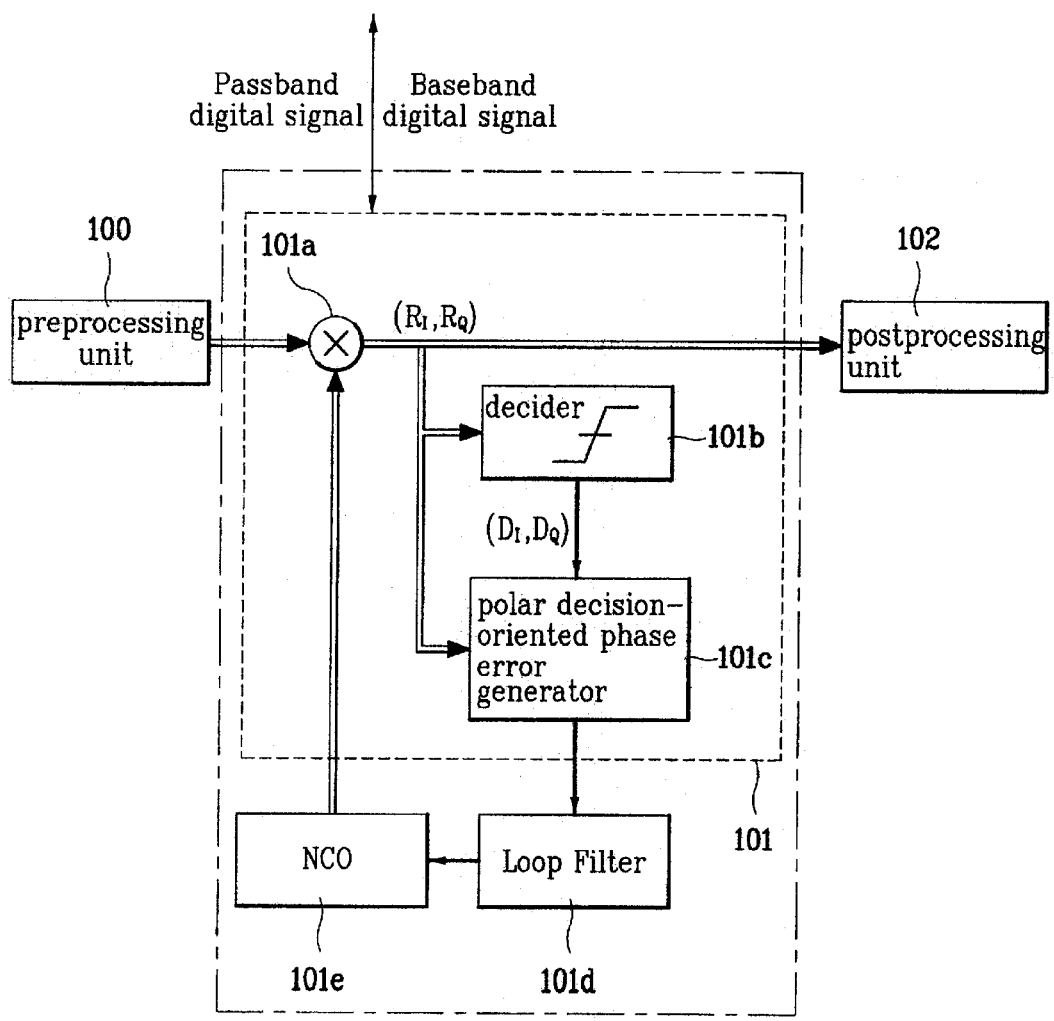
FIG. 1 is a schematic block diagram of a carrier recovery device in a conventional QAM receiver.

In FIG. 4, the components other than the polar decision-oriented phase error generator 401c are similar to those of FIG. 1 and will not be described in detail. That is, preprocessing unit 100 extracts a passband signal on a specific channel containing frequency offset and phase jitter via a tuner and converts the extracted passband signal to a digital signal, which is then output to the weighted polar decision-oriented phase error detector 401.

The mixer 401a of the weighted polar decision-oriented phase error detector 401 demodulates the passband digital signal containing frequency offset and phase jitter, generated from the preprocessing unit 100, with sine/cosine waves from the numerical control oscillators 40 to generate a baseband digital signal $(R_I, R_Q)$ with the frequency offset and phase jitter recovered. The decider 401*b* generates a deciding signal character ($D_I$, $D_Q$) conformable to the individual signal level of the baseband digital signal ($R_I$, $R_Q$) demodulated by the mixer 401*a*. The deciding signal character is then output to the weighted polar decision-oriented phase error generator 401*c*.

Figure 3:
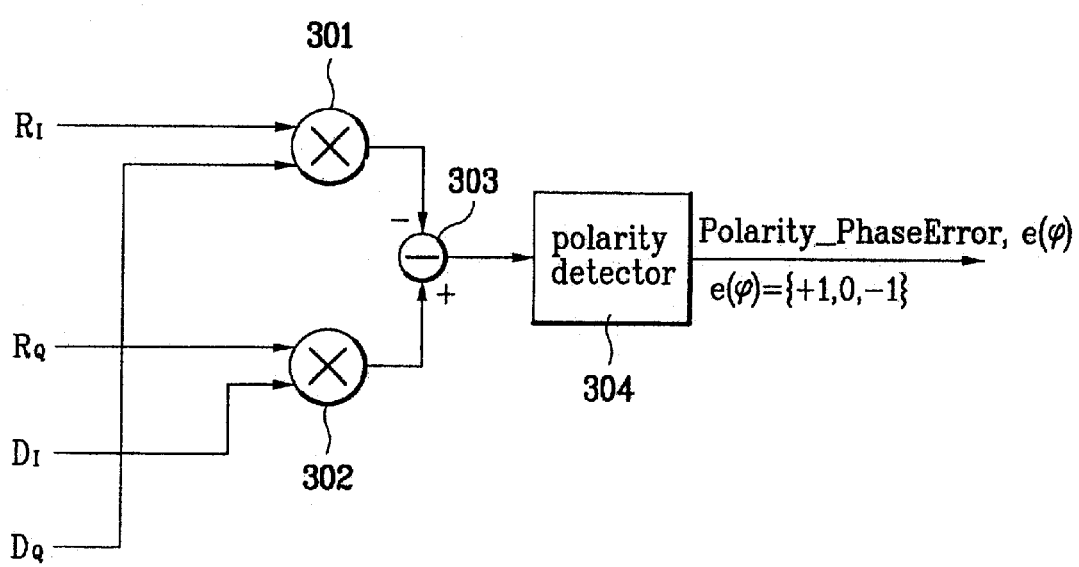
FIG. 3 is a detailed block diagram of the polar decision-oriented phase error generator shown in FIG. 1.
Figure 5:
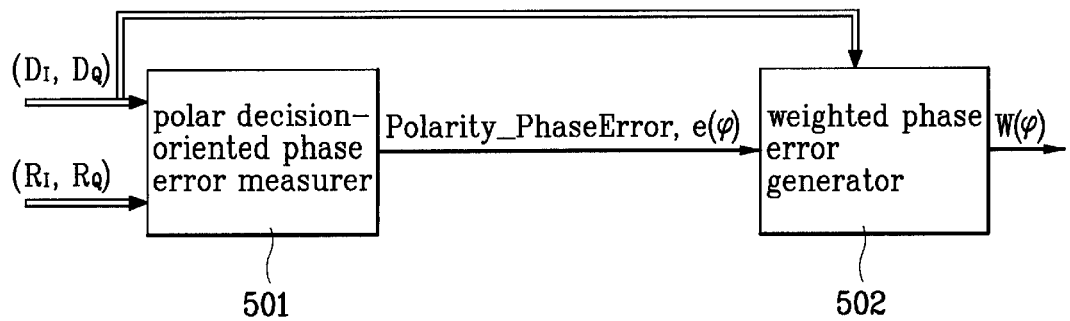
FIG. 5 is a detailed block diagram of the weighted polar decision-oriented phase error generator shown in FIG. 4.

FIG. 5 is a detailed block diagram of the weighted polar decision-oriented phase error generator 401*c*, which comprises a polar decision-oriented phase error measurer 501, and a weighted phase error generator 502. The polar decision-oriented phase error measurer 501 may be one of the conventional phase error measurers, such as the polar decision-oriented phase error generator of FIG. 3. Namely, the polar decision-oriented phase error measurer 501 calculates the difference between the phase θ of the demodulated baseband digital signal ($R_I$, $R_Q$) and the phase φ of the deciding signal character ($D_I$, $D_Q$), and detects the polarity e(φ) of the phase difference. The polar phase error e(φ) thus detected has a value of +1, 0 or −1.

The weighted phase error generator 502 generates, according to the equation 1, a weighted phase error W(φ) using the polar phase error e(φ) detected by the polar decision-oriented phase error measurer 501 and the deciding signal character ($D_I$, $D_Q$) generated by the decider 401*b*.

Figure 6:
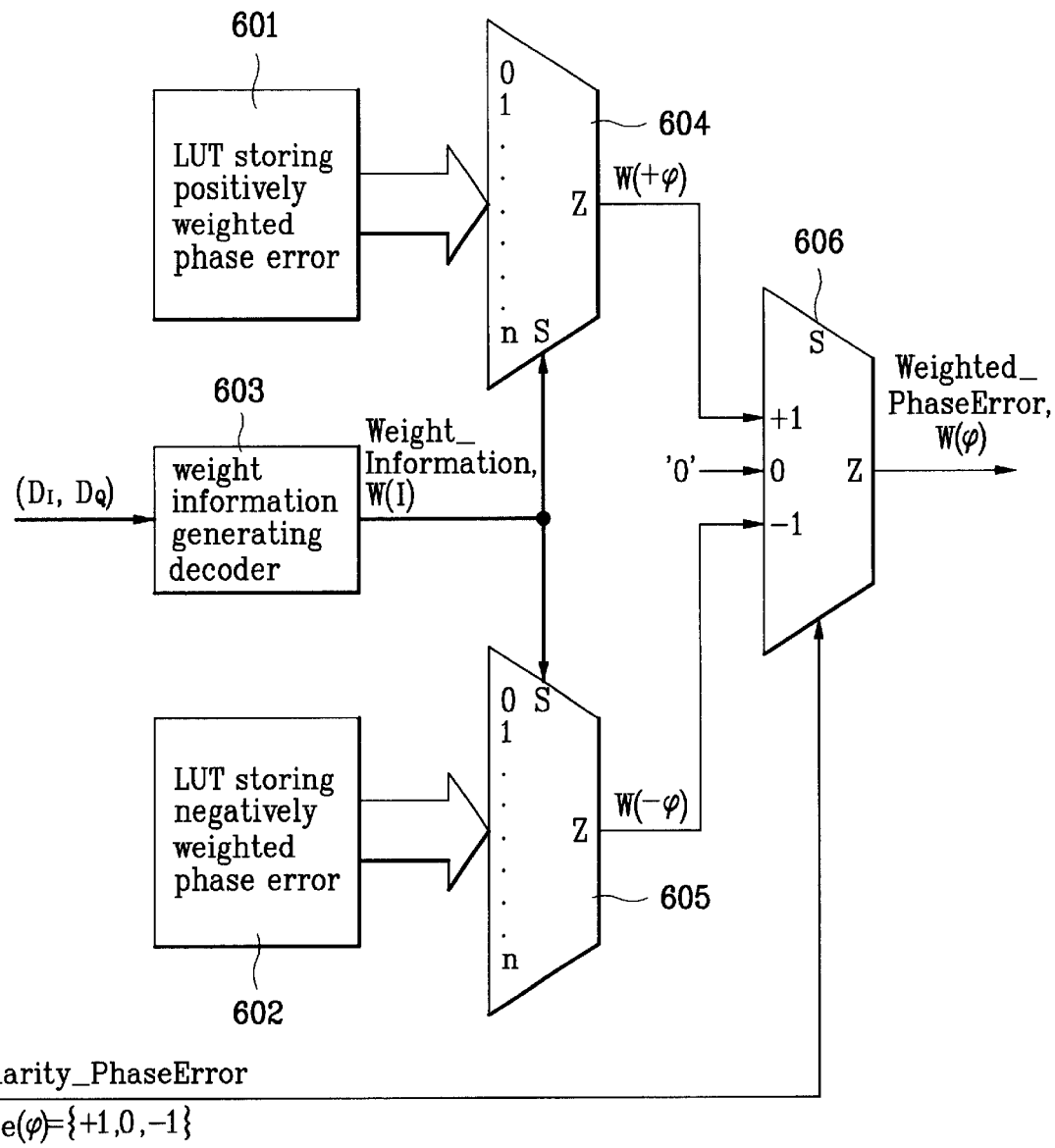
FIG. 6 is a detailed block diagram of the weighted phase error generator shown in FIG. 5.

FIG. 6 is a detailed block diagram of the weighted phase error generator 502, which comprises a first loop-up table 601 storing positively weighted phase errors W(+φ), a second loop-up table 602 storing negatively weighted phase errors W(−φ), a weight information generating decoder 603, and first to third selectors 604, 605 and 606.

Figure 7:
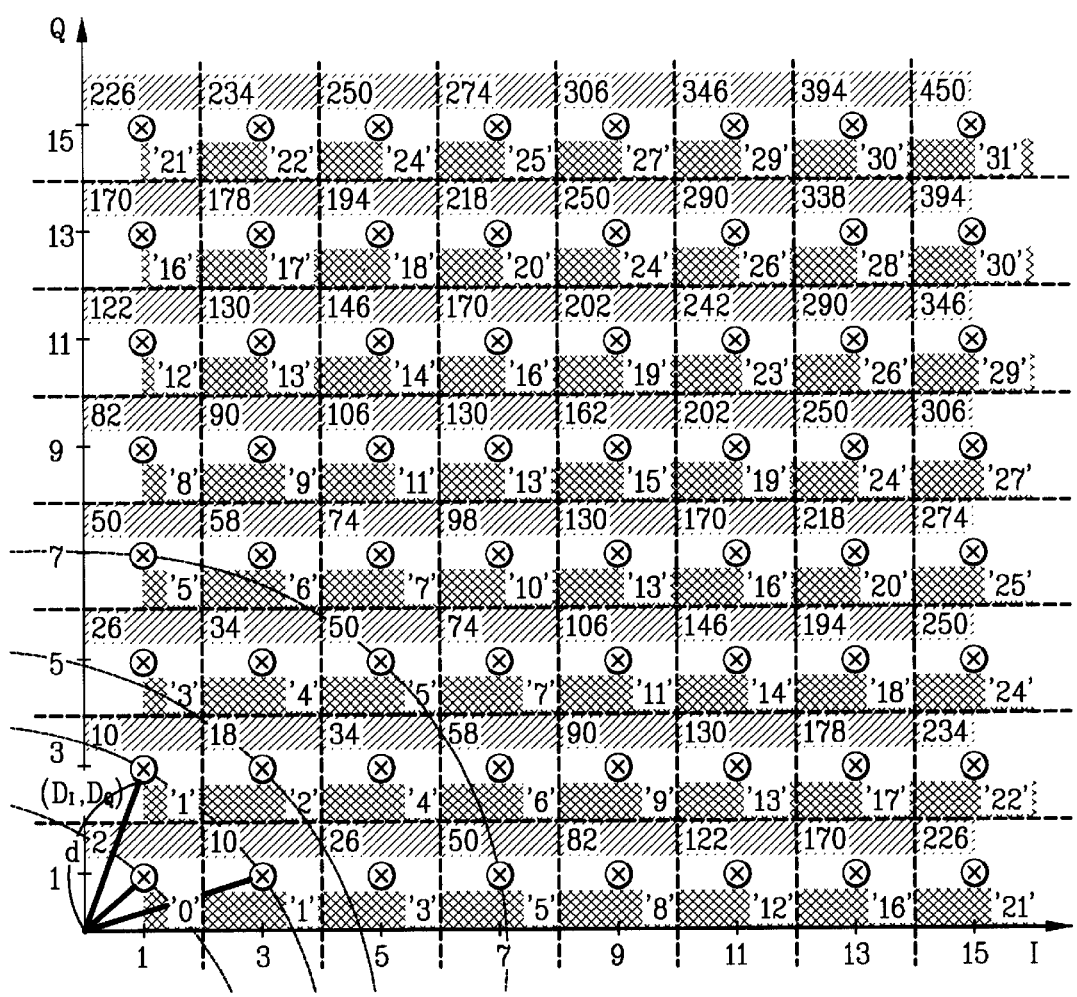
FIG. 7 is a 256-QAM character diagram showing an example that decoded weight information is detected from the magnitude of the deciding signal character according to the present invention.

The weight information generating decoder 603 receives the decision signal character ($D_I$, $D_Q$) from the decider 401*b* to calculate the magnitude of the deciding signal character $D_I^2+D_Q^2$, and then generates decoded weight information W(I) as shown in FIG. 7 from the magnitude of the deciding signal character $D_I^2+D_Q^2$.

FIG. 7 is an exemplary 256-QAM character diagram showing extraction of the decoded weight information W(I) from the magnitude of the deciding signal character $D_I^2+D_Q^2$. The deciding signal characters are symmetrical and varied in sign with respect to the individual quadrants. For that reason, it has only to obtain all deciding signal characters in the first quadrant and apply them to the other quadrants.

That is, the magnitude of the deciding signal character d (=$D_I^2+D_Q^2$) is the vector size from the origin to the deciding signal character ($D_I$, $D_Q$). For example, when the magnitude of the deciding signal character d (=$D_I^2+D_Q^2$) is 2, the weight information is decoded as "0"; and when the magnitude of the deciding signal character d (=$D_I^2+D_Q^2$) is 10, the weight information is decoded as "1". This shows that the decoded weight information is proportionate to the magnitude of the deciding signal character d (=$D_I^2+D_Q^2$).

For 256-QAM characters, 64 weight information can be produced in each quadrant. However, the characters of the same diameter are all the same in vector size and hence in decoded weight information. For example, assuming that three deciding signal characters have a magnitude d (=$D_I^2+D_Q^2$) of 50, all the weighted information is decoded as "5" and accordingly 32 decoded weight information (e.g., integers ranging from 0 to 31) is produced in each quadrant. The first look-up table 601 stores normalized positively weighted phase errors W(+φ) on the vertical axis of the characteristic curve of FIG. 8 in correspondence to the weight information W(I) on the horizontal axis of the characteristic curve as generated from the weight information generating decoder 603.

Figure 8:
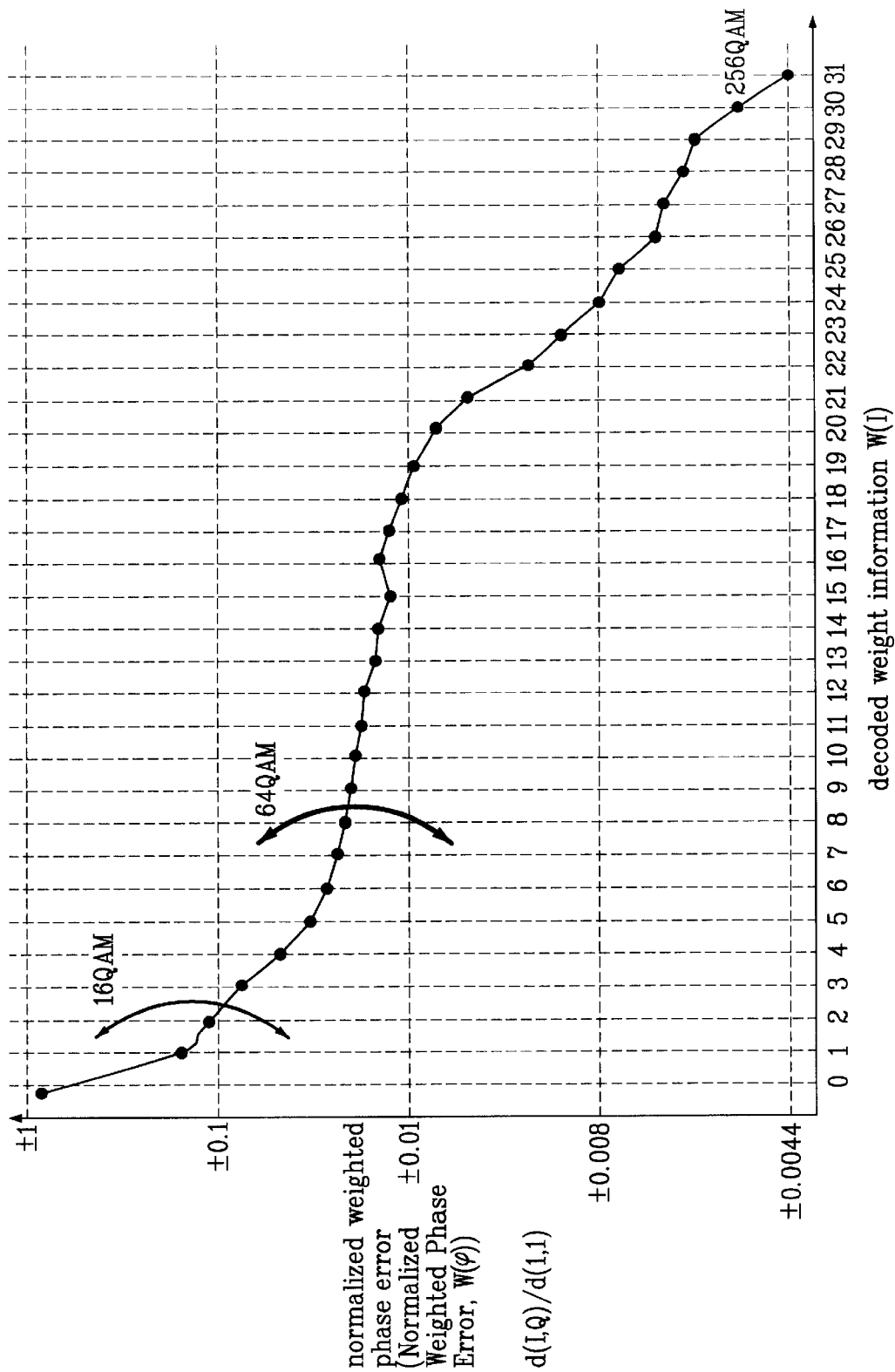
FIG. 8 is a 16/64/256-QAM characteristic diagram in which a weighted phase error is detected from the decoded weight information according to the present invention.

The second look-up table 602 stores normalized negatively weighted phase errors W(−φ) on the vertical axis of the characteristic curve of FIG. 8 in correspondence to the weight information W(I) on the horizontal axis of the characteristic curve as generated from the weight information generating decoder 603.

Namely, the weighted phase errors are inversely proportional to the magnitude of the deciding signal character d (=$D_I^2+D_Q^2$) and stored in the first and second look-up tables 601 and 602. This shows that the positively/negatively weighted phase errors mapped to the decoded weight information are in inverse proportion to the magnitude of the deciding signal character d (=$D_I^2+D_Q^2$). The positively/negatively weighted phase errors can be normalized and then stored in the first and second look-up tables 601 and 602 with a view to setting a standard.

Contrarily, the weight information generating decoder 603 can also decode the weight information, according to the intension of the designer, such that the weight information should be in inverse proportion to the magnitude of the deciding signal character d (=$D_I^2+D_Q^2$). The phase errors in the look-up tables 601 and 602 have to be mapped to a larger value as the weight information has a larger value. Accordingly, the positively/negatively weighted phase errors mapped to the decoded weight information are inversely proportional to the magnitude of the deciding signal character d (=$D_I^2+D_Q^2$).

The first selector 604 is a sort of multiplexer that uses the weight information W(I) generated by the weight information generating decoder 603 as a control signal to selectively output one of the positively weighted phase error values W(+φ) stored in the first look-up table 601.

The second selector 605 is also a sort of multiplexer, which uses the weight information W(I) generated by the weight information generating decoder 603 as a control signal to selectively output one of the negatively weighted phase error values W(−φ) stored in the second look-up table 602. For example, when the weight information W(I) is 2, the procedure of FIG. 8 is performed such that the normalized positively/negatively weighted phase errors (e.g., ±0.1) mapped to a value of 2 are output from the look-up tables 601 and 602 via the first and second selectors 604 and 605, respectively.

The number of the inputs of the first and second selectors 604 and 605, as indicated by "n", is dependent upon the modulation method. For example, "n" is 31 for the 256-QAM method and 8 for the 64-QAM method. "n" designed to the maximum can be applied to any method. For example, "n" designed to the 256-QAM can also be applied to 64-QAM, 16-QAM and QPSK.

The third selector 606 uses the polar phase error e(φ) generated by the polar decision-oriented phase error measurer 501 as a control signal to selectively generate the output of the first or second selector 604 or 605 or "0". That is, when the polar phase error e(φ) is +1, the third selector 606 selects the positively weighted phase error, selectively output from the first selector 604, as a weighted phase error W(φ); when the polar phase error e(φ) is −1, the third selector 606 selects the negatively weighted phase error, selectively output from the second selector 605, as a weighted phase error W(φ); and when the polar phase error e(φ) is 0, the third selector 606 selects the phase error of zero as a weighted phase error W(φ).

The weighted phase error polar phase error W(φ) output from the third selector 606 is cumulatively fed into the loop filter 402 to form frequency offset Δω and phase jitter Δθ. The loop filter 402 is a general primary baseband loop filter, which cumulates the weighted phase error W(φ) to generate the sum of the frequency offset and the phase jitter, Δω+Δθ.

The frequency offset Δω and the phase jitter Δθ generated from the loop filter 402 are fed into the numerical control oscillator 403, which generates sine and cosine waves sin $(\omega_c+\Delta\omega+\Delta\theta)$ and $\cos(\omega_c+\Delta\omega+\Delta\theta)$ using as a center frequency the intermediate frequency $\omega_c$ generated from the loop filter 402. The sine and cosine waves are output to the mixer 401a.

Figure 9:
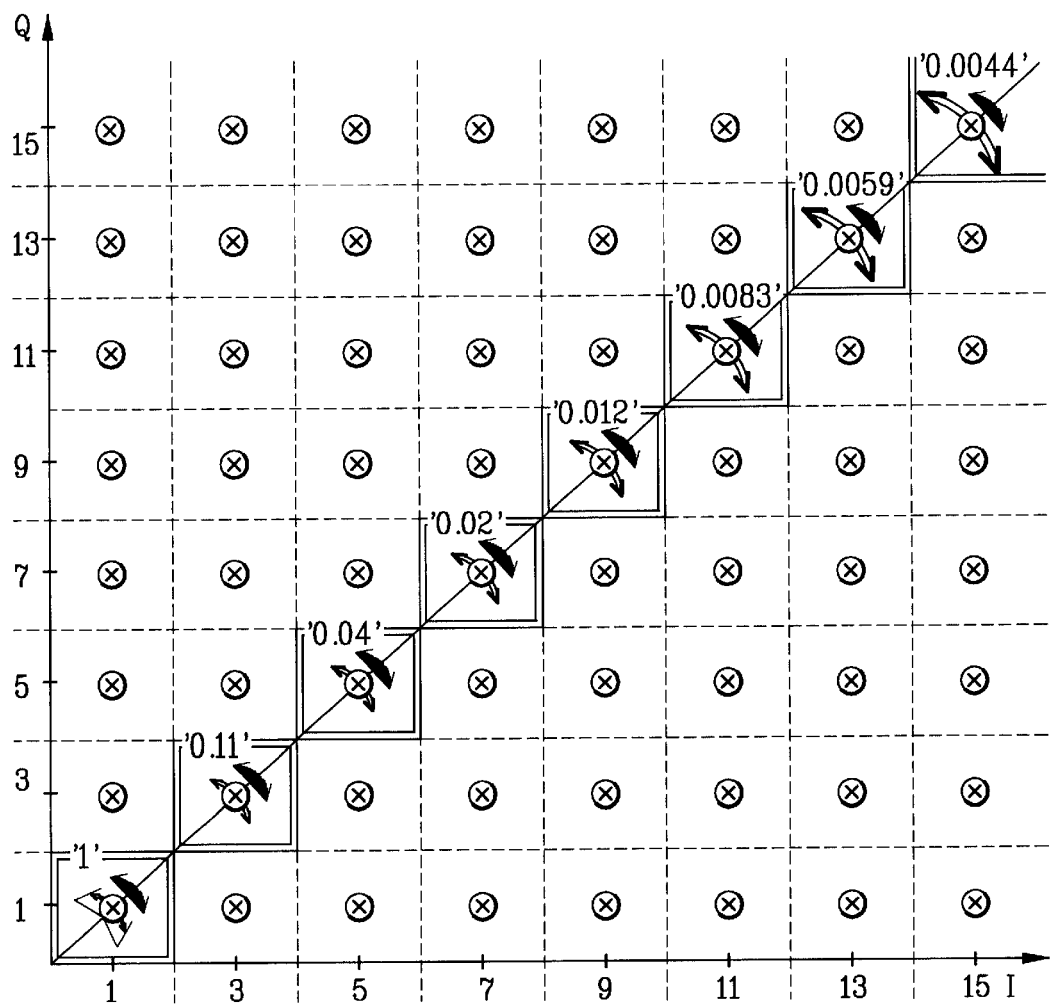
FIG. 9 is a 256-QAM character diagram showing the characteristics of the phase noises caused by the conventional polar phase error detector and the weighted phase error detector of the present invention.

FIG. 9 is a 256-QAM character diagram showing the characteristics of a phase noise detected with the conventional polar phase error detector and a phase noise detected with the weighted phase error detector of the present invention. As shown in the character diagram of FIG. 9, the conventional carrier recovery method reflects the polar phase error $e(\phi)$ uniformly to all characters irregardless of the magnitude of the deciding signal character $D_I^2+D_Q^2$, so that the phase jitter of demodulated signal characters increases with an increase in the magnitude of the deciding signal character $D_I^2+D_Q^2$. That is, the phase jitter of the demodulated signal character becomes larger with an increased distance from the origin.

Contrarily, the present invention uses a weighted value to reflect the phase error inversely proportionate to the magnitude of the deciding signal character $D_I^2+D_Q^2$. Thus, as shown in the character diagram of FIG. 9, the phase jitter of the demodulated signal characters is constant in size irrespective of the magnitude of the deciding signal character $D_I^2+D_Q^2$.

The present invention is also applicable to a double side band (DSB) modulation method in which the symbols are not present in the same space (of the same radius).

As described above, the QAM receiver and the carrier recovery method according to the present invention apply a weighted phase error inversely proportionate to the magnitude of the deciding signal character so that the phase jitter of the demodulated signal characters is constant in size irrespective of the magnitude of the deciding signal character. Consequently, acquisition/tracking can be rapidly achieved to minimize the frequency offset of several hundreds of KHz and the phase jitter generated from a tuner or an RF oscillator. Such an acquisition/tracking can be performed with high reliability even at a low SNR and a high channel ISI (ghost).

What is claimed is:

1. A quadrature amplitude modulation (QAM) receiver, which converts a received passband signal on a specific channel to a baseband digital signal and then extracts a transmission symbol through carrier recovery, the QAM receiver comprising:

a signal generator for multiplying the passband digital signal by a sine/cosine wave into a demodulated baseband digital signal, and generating a deciding signal character conformable to the individual signal level of the demodulated baseband digital signal;

a first phase error measurer for calculating the phase difference between the demodulated baseband digital signal and the deciding signal character, and detecting the polarity of the phase difference to be output as a first phase error;

a second phase error measurer for using the fist phase error detected by the first phase error measurer to output a second phase error having a weighted value; and a filter and an oscillator for cumulating the received second phase error, and generating a sine/cosine wave proportionate to the circulated phase error, the sine/cosine wave being output to the signal generator, wherein the second phase error measurer comprises:

a weight information generating decoder for calculating the magnitude of the received deciding signal character, and generating weight information proportionate to the magnitude of the deciding signal character;

a first memory for storing positively weighted phase errors inversely proportionate to the weight information;

a second memory for storing negatively weighted phase errors inversely proportionate to the weight information;

a first selector using the weight information as a selection signal to selectively output one of the positively weighted phase errors stored in the first memory;

a second selector using the weight information as a selection signal to selectively output one of the negatively weighted phase errors stored in the second memory; and a third selector using the first phase error as a selection signal to selectively generate the output of the first or second selector, or "0" as a second phase error.

2. The QAM receiver as claimed in claim 1, wherein the signal generator demodulates the passband digital signal into a baseband digital signal with frequency offset and phase jitter recovered.

3. The QAM receiver as claimed in claim 1, wherein the first phase error measurer comprises:

a first multiplier for multiplying the in-phase component $D_I$ of the deciding signal character by the in-phase component $R_I$ of the demodulated signal character;

a second multiplier for multiplying the quadrature component $D_Q$ of the deciding signal character by the quadrature component $R_Q$ of the demodulated signal character;

a subtracter for calculating the difference between the outputs of the first and second multipliers; and a polarity extractor for extracting the polarity from the output of the subtracter, the extracted polarity being then output as the first phase error.

4. The QAM receiver as claimed in claim 1, wherein the magnitude of the deciding signal character is the vector size from the origin to the deciding signal character $(D_I, D_Q)$.

5. The QAM receiver as claimed in claim 1, wherein the weight information generating decoder decodes the deciding signal characters of the same radius into the same weight information.

6. The QAM receiver as claimed in claim 1, wherein the weight information generating decoder obtains weigh information proportionate to the magnitude of the deciding signal character in any one of the first to fourth quadrants, and applies the same weight information to each of the other quadrants.

7. The QAM receiver as claimed in claim 1, wherein the weight information generating decoder outputs 32 distinct weight information for 256-QAM characters.

8. The QAM receiver as claimed in claim 1, wherein when the weight information generating decoder generates weight information inversely proportionate to the magnitude of the deciding signal character, the first and second memories store positively and negatively weighted phase errors proportionate to the weight information, respectively.

9. The QAM receiver as claimed in claim 1, wherein the first and second memories store normalized positively and negatively weighted phase errors, respectively.

10. The QAM receiver as claimed in claim 1, wherein the number of the inputs of the first and second selectors is dependent upon the number of the weight information for M-QAM character of which the number varies according to the QAM modulation method, the weight information having a different value from one another.

11. The QAM receiver as claimed in claim 1, wherein the number of the inputs of the first and second selectors is dependent upon the number of the weight information for QAM characters of which the number is at the maximum in the QAM modulation method, wherein the number of inputs determined is applicable to all QAM modulation methods.

12. A carrier recovery method for a QAM receiver, which converts a received passband on a signal on a specific channel to a baseband digital signal and the perform a carrier recovery, the carrier recovery method comprising the steps of:

(a) multiplying the passband digital signal by a sine/cosine wave into a demodulated baseband digital signal, and generating a deciding signal character conformable to the individual signal level of the demodulated baseband digital signal;

(b) calculating the phase difference between the demodulated baseband digital signal and the deciding signal character, and detecting the polarity of the phase difference to be output as a first phase error;

(c) using the first phase error as a control signal to output a second phase error having a weighted value; and (d) cumulating the received second phase error, and generating a sine/cosine wave proportionate to the cumulated phase error, the sine/cosine wave being output to the step (a), wherein the step (c) comprises the steps of:
determining the magnitude of the received deciding signal character, and generating weight information proportionate to the magnitude of the deciding signal character;

storing positively weighted phase errors inversely proportionate to the weight information;

storing negatively weighted phase errors inversely proportionate to the weight information;

using the weight information as a selection signal to selectively output one of the positively weighted phase errors stored in the first storing step;

using the weight information as a selection signal to selectively output one of the negatively weighted phase errors stored in the second storing step; and using the first phase error as a selection signal to selectively generate the output of the first or second selecting steps, or "0" as second phase error.

13. The carrier recovery method as claimed in claim 12, wherein the step (b) extracts the first phase error $e(\phi)$ according to the following equation:

$$e(\phi) = sgn(\theta - \phi) = sgn(R_Q * D_I - R_I * D_Q)$$

wherein the sng(#) operator represents an operator for detecting the polarity of #; $R_I$ and $R_Q$ represent the in-phase and quadrature components of the demodulated signal character, respectively; $\theta$ represents the phase of the demodulated signal character; $D_I$ and $D_Q$ represent the in-phase and quadrature components of the deciding signal character, respectively; and $\phi$ represents the phase of the deciding signal character.

14. The carrier recovery method as claimed in claim 12, wherein the magnitude of the deciding signal character is the vector size from the origin to the deciding signal character $(D_I, D_Q)$.

15. The carrier recovery method as claimed in claim 12, wherein the deciding signal characters of the same radius are decoded into the same weight information.

16. The carrier recovery method as claimed in claim 12, wherein the weight information proportionate to the magnitude of the deciding signal character are obtained in any one of the first to fourth quadrants and then applied to each of the other quadrants.

17. The carrier recovery method as claimed in claim 12, wherein when the weight information generating step generates weight information inversely proportionate to the magnitude of the deciding signal character, the first and second storing steps store positively and negatively weighted phase errors proportionate to the weight information, respectively.

18. The carrier recovery method as claimed in claim 12, wherein the first and second storing steps normalize and store positively and negatively weighted phase errors, respectively.

* * * * *